3,370,362
TEACHING AID FOR DEMONSTRATING GAS
AND SOLID STATE LASERS
James S. Dodson, 1348 E. Ocean View Ave.,
Norfolk, Va. 23503
Filed Apr. 4, 1966, Ser. No. 539,875
20 Claims. (Cl. 35—19)

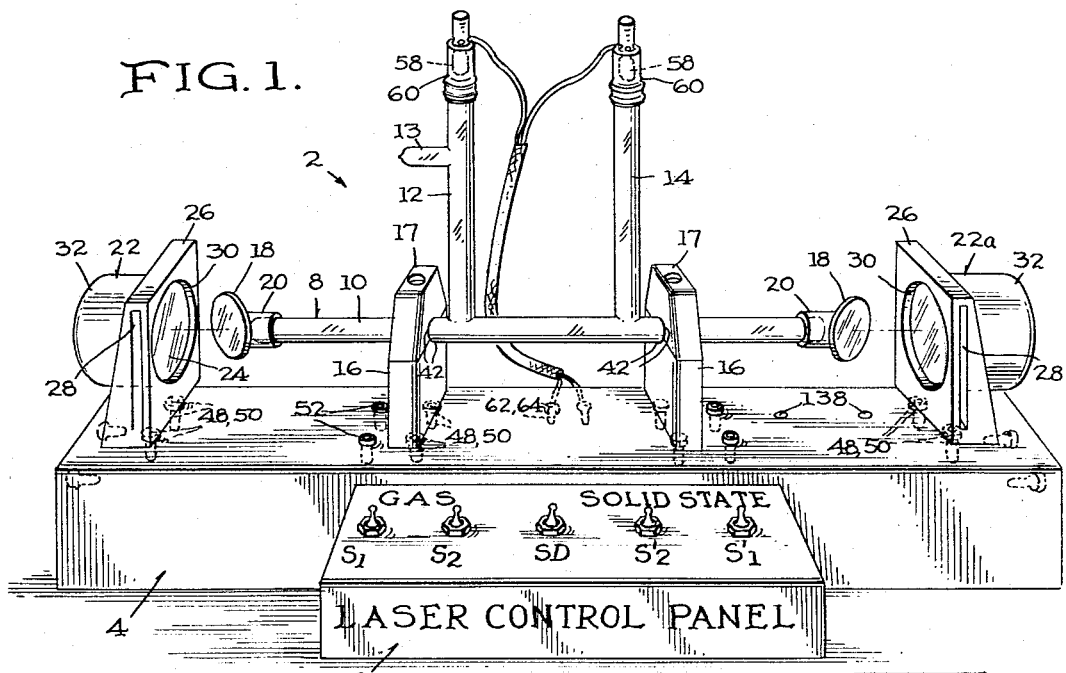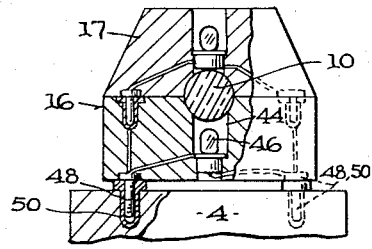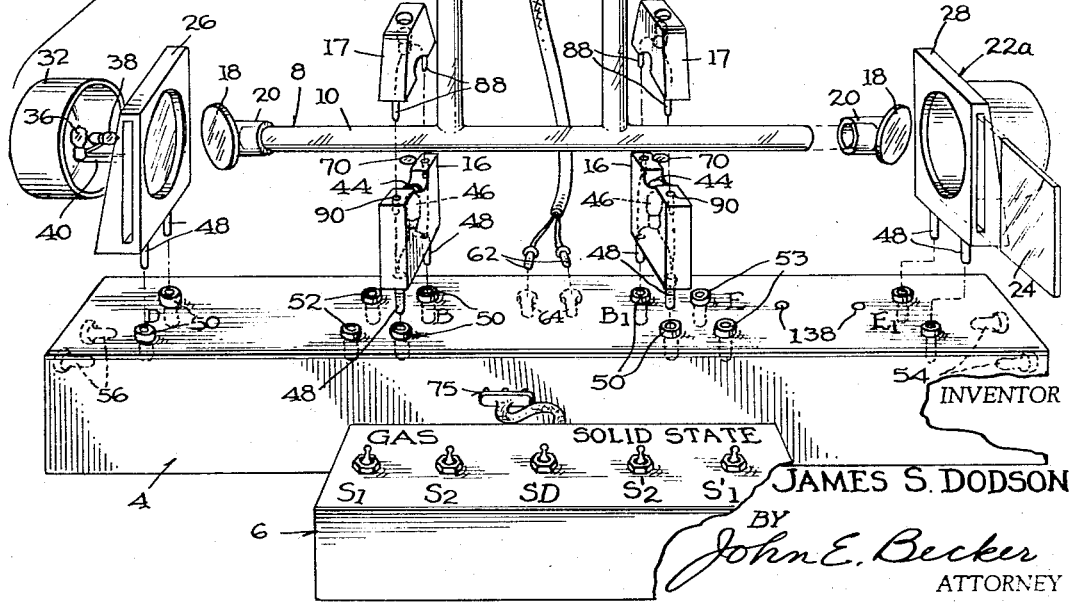

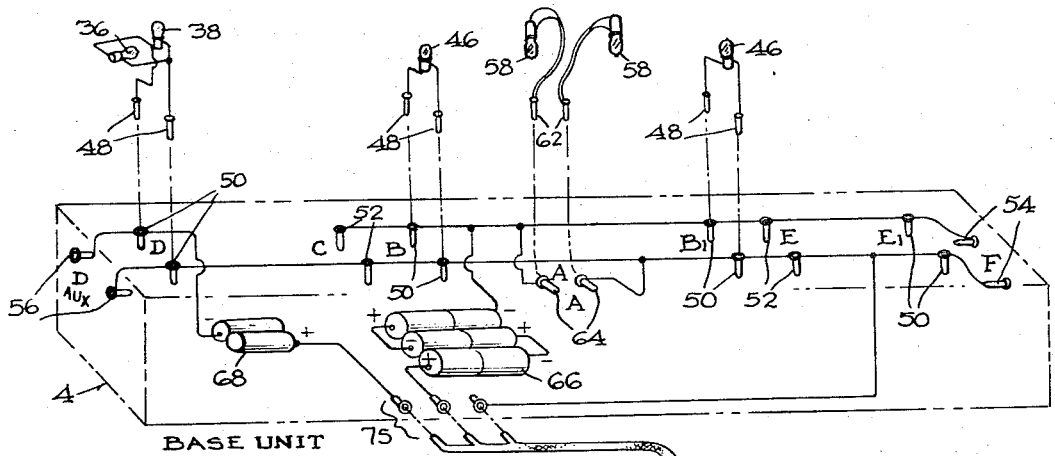
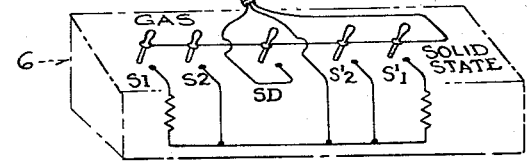
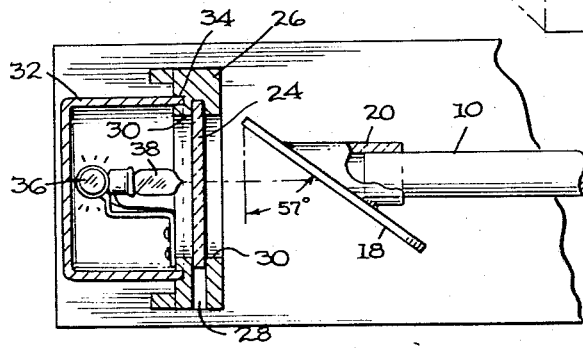
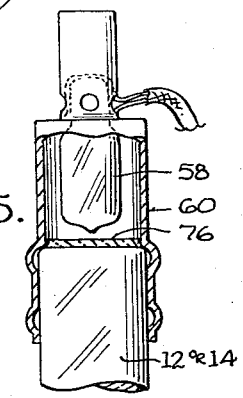
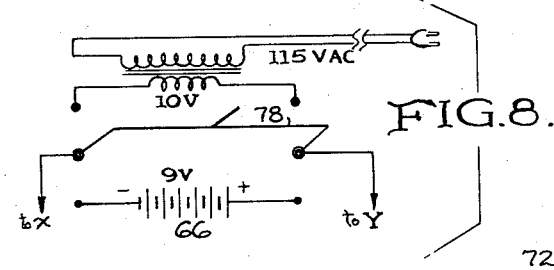
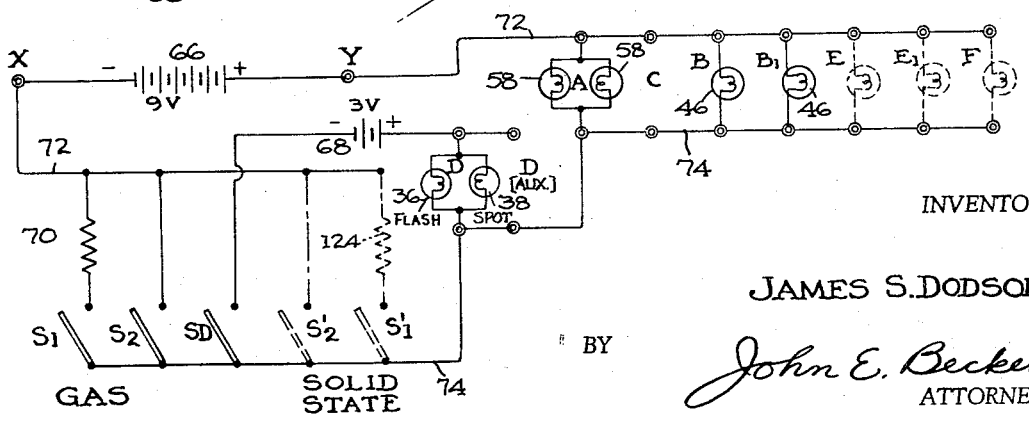
INVENTOR
JAMES S. DODSON
BY John E. Becker
ATTORNEY

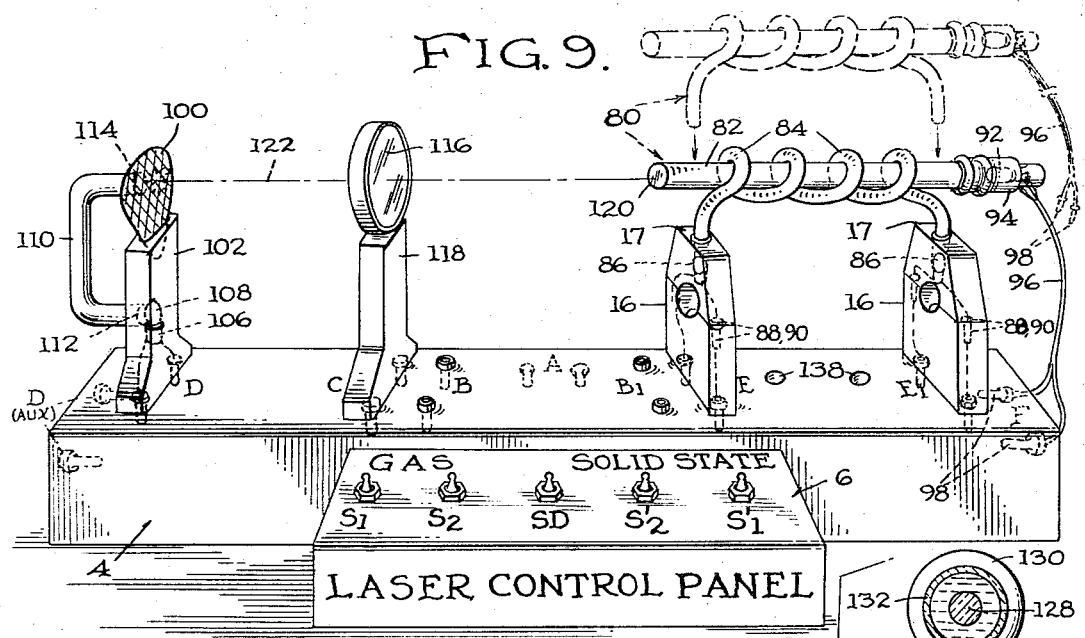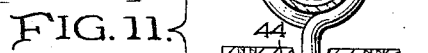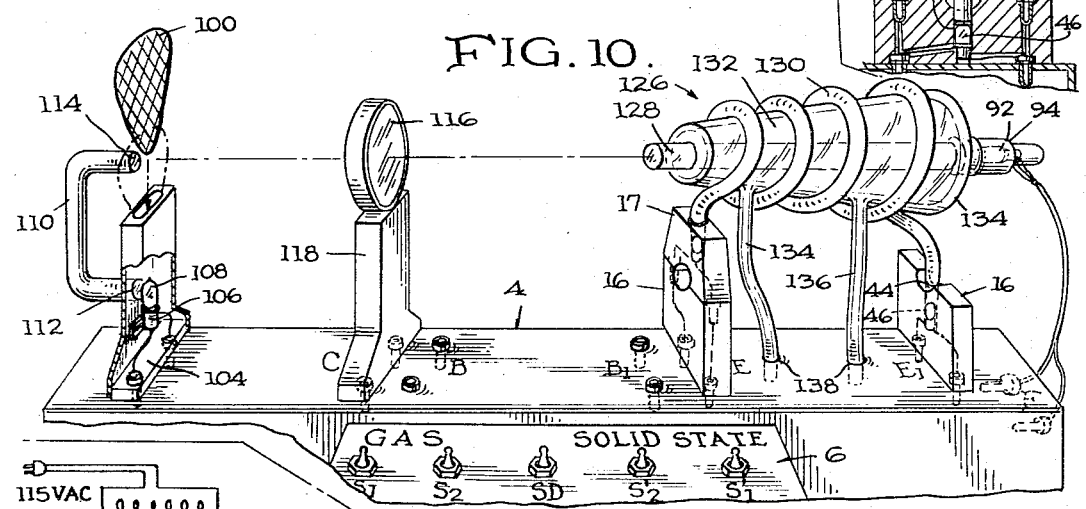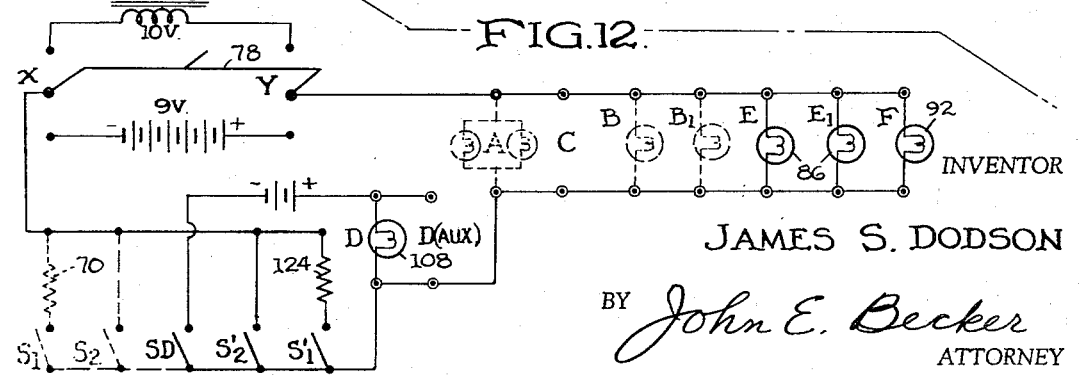

The present invention relates to teaching aid demonstrators, and more particularly to devices which are suitable for classroom demonstration of the principle behind the operation of optical gas and solid state lasers, or other phenomena of stored energy and trigger release.

The laser, which is an acronym for the phrase light amplification by stimulated emission of radiation, is a relatively new development in the science field, and is basically a device for producing a very intense beam of light. The light as produced by said device is in the form of a "coherent" beam capable of travelling exceptionally great distances with relatively little spread. It is capable of burning holes in diamonds, illuminating the moon from the earth, carrying sound or as delicate a job as providing a ray finer than a needle for use in aiding eye surgery and fighting cancer. It is apparent that the development and understanding of the laser is of special significance and will serve as the basis for advancing technology in various fields including chemistry, biology, astronomy, communication, navigation, medicine, weaponry and the like. The construction of a real operating laser, which can be a very dangerous and deadly device and is relatively quite expensive. Accordingly, there exists a need for a less dangerous and less expensive demonstration apparatus which will suffice to demonstrate and teach the principle of the various lasers.

While the form of a real gas laser presents a deceptive appearance of simplicity comprising merely a gas (helium-neon) discharge tube having flat Brewster windows disposed at a predetermined angle on each end of the tube facing a pair of small dielectric mirrors, yet the construction thereof requires very special and precise fabrication of special and costly components. When the power is supplied, as through a pair of power supply riser tubes projecting up and communicating with the gas filled laser tube, the device emits as many as six separate beams or pulses of very intense coherent light, responsive to the excited atoms of ionized gas which emit light waves which are reflected back and forth between the mirrors until enough power is built up for the light waves to lase into a beam of pure light.

The solid state laser, in one of its simplest forms, comprises a small rod of synthetic ruby, or emerald, with the chromium ions in the ruby serving as activators, which within the rod are subjected to radiation of particular light waves from a spirally encircling flash tube or light pump. The white light from the flash tube is absorbed by the ruby crystal and the ions of chromium therein are "excited" from a zero energy level to a higher energy level, by the light radiation. This excitation of the ions is commonly called optical pumping. When, at a certain threshold of energy input, the chromium ions suddenly change from a higher-level state back to their normal or low-level state, they transmit a powerful pulse of light.

Accordingly, it is a primary object of the present invention to provide a suitable classroom teaching aid to represent dynamically and visually the phenomenon of both the gas laser and the solid state laser with its associated optical pumping and resultant energy release.

Another object of the invention is to provide a teaching aid of the aforementioned character which is easily and safely operated and which may be used for repeated and selectively interchangeable demonstrations of both the gas and solid state lasers.

A further object is to provide such a device which is compact and lends itself to inexpensive manufacture from readily available component parts.

These and other objects and advantages of the invention, such as the provision of such a device having readily separable component parts adaptable for easy assembly and disassembly, will become more apparent to those skilled in the art from reading the following detailed specification setting forth preferred construction and arrangement of parts of exemplary embodiments which have been very successfully operated. Reference is made to the accompanying drawings wherein:

FIG. 1 is a front perspective view of an exemplary form of simulated gas laser;

FIG. 2 is a front perspective view similar to FIG. 1 but showing many of the component parts in exploded disassembled condition;

FIG. 3 is a fragmentary detail view partially in cross-section and partially in elevation showing certain mounting and wiring details of the laser tube;

FIG. 4 is a fragmentary enlarged plan view with certain parts in cross-section to better show detailed structure and relation;

FIG. 5 is another enlarged detail view partially in cross-section and partially in elevation;

FIG. 6 is a perspective diagrammatic view of the electrical connections for operation of the instant invention;

FIG. 7 is a electrical schematic of the wiring diagram of FIG. 6, showing in solid lines the components required for demonstrating the gas laser embodiment of FIGS. 1–6;

FIG. 8 is a fragmentary electrical schematic showing an alternative power source which may be substituted for that shown in FIG. 7;

FIG. 9 is a front perspective view of a different embodiment of the invention depicting the demonstration of a simulated solid state ruby rod laser;

FIG. 10 is a fragmentary view similar to FIG. 9 but illustrative of an alternate simulated, water cooled, solid state emerald rod laser form, with certain parts broken away to show details thereof;

FIG. 11 is a fragmentary cross-sectional detail view of the water-cooled laser rod of FIG. 10; and FIG. 12 is a electrical schematic of the wiring diagram with those parts shown in solid lines representing the circuitry necessary to demonstrate the solid state lasers.

Referring primarily to FIGS. 1 through 5 of the illustrative drawings, there is represented a gas laser demonstration device generally designated 2 comprising a base unit 4 for mounting the various components and an associated control panel 6 for effecting the operation of the simulated gas laser tube assembly 8. The said tube assembly 8 is fabricated from a transparent, light-conducting, plastic material, such as 1" diameter polished acrylic or polystyrene cylindrical stock material and includes a base rod 10, approximately 13" long, and two shorter rods 12 and 14, approximately 8" long, fused or glued to the base rod in the vertical manner shown and spaced apart to resemble an inverted P1 symbol when mounted on a pair of assembly holding brackets 16, 16. The base rod 10 is used to correspond to the main neon gas filled tubing of a real laser and the two upright rods 12 and 14 correspond to the electrode housing tubes associated therewith. Upright rod 12 may be further provided with a short, laterally projecting rod 13 which would correspond to the tube used for evacuating, filling and sealing the gas envelope or tubing of a real laser.

A pair of "Brewster" windows, 18, 18, fabricated of small discs or other suitable shaped pieces of clear glass or plastic, such as discarded eyeglass lenses, are removably attached to the ends of the base rod 10, as by being glued to short tubular sleeves 20, 20 which are adaptable to slip on and off base rod 10 as better shown in the exploded view of FIG. 2. In the operation of a real gas laser, the "Brewster" windows have a special purpose, are cut from quartz crystal at a special angle and mounted at a 57° angle at each end of the laser tube. This is because light will normally bend when passing through glass but if the glass is angled and cut properly the light waves will pass through in a straight line for a reason to be more fully explained hereinafter. Accordingly, windows 18, 18 are each shown angularly mounted at the required 57° angle, see FIG. 4.

Spaced from each end the base rod 10 and the "Brewster" windows 18, 18, are a pair of mirror mounting sub-assemblies 22, 22, which correspond to the heat-resistant dielectric mirror assemblies used in a real laser to reflect the light impulses back and forth until it is ready to lase. Inasmuch as no heat problems are present in the instant demonstration device, any inexpensive sheet mirrors 24, 24 of approximately 3" in diameter, such as discarded ladies compact mirrors, may be used. Any inexpensive material such as wood, metal or plastic may be used to construct a pair of mounting brackets 26, 26, each having a slot or groove 28 to receive the mirror and position it over a window 30 provided centrally of the brackets. The mirror assemblies are provided with cylindrical covers 32, 32 which may be removably mounted as by a press or friction fit within a corresponding groove 34, FIG. 4, provided in the back of each bracket 26. The left-hand mirror sub-assembly 22 also houses within cover 32 preferably a miniature flash bulb 36 as used in photographic cameras, and a small flashlight type of spot lamp 38 supported by a suitable mounting arm 40 attached to the back of bracket 26. The right-hand sub-assembly 22a does not embody any electrical components. The said covers 32 may be of the type used in spray starch or spray paint cans.

The base rod mounting brackets 16, 16 are each easily fabricated of similar inexpensive material and have a separable upper part 17, both parts of which are provided with semi-circular notches 42 to securely cradle the rod 10 therein. Both parts of the brackets 16 are provided with vertically disposed recesses communicating with both of the notched areas 42, 42. In the lower part of each bracket, the recess is designated 44 and has mounted therein a small flash light bulb or lamp 46 which is part of the illuminating means for the rod assembly 8. Each of the mounting brackets 26 and 16 are further provided with suitable means for removably attaching them to the base unit 4, and preferably take the form of a pair of spaced conventional jack or banana-type plugs 48 affixed to the bottom of each of said brackets with their corresponding receptacle components 50 being mounted in the upper wall of the base unit 4, as more clearly illustrated in FIGS. 2 and 3. The flashlight bulbs 46 are each wired to the jacks 48 as is apparent from the illustrations, the purpose of which will be clarified in the following. Additional sets of correspondingly aligned jack receptacles 52 and 53 are provided and outwardly spaced from those of brackets 16, 16, and two other sets 54, 56 mounted on each end which are adapted to receive some of the jacks of similar mounting brackets or other equipment used for the additional solid state laser demonstration means. Addition illuminating means for the assembly 8 include a pair of similar small flashlight type lamps 58, 58 which are mounted within housing members 60, 60 and are adapted for a slip fit over the upper ends of "electrode" rods 12 and 14, better seen in FIGS. 1, 2 and 5. The said lamps 58, 58 are suitably wired for connection into the electrical circuitry to be described hereinafter, and preferably are provided with jack type connectors 62, 62 respectively for connection with receptacles 64, 64 provided in the rear wall of base unit 4, similar to the other connectors 48, 50.

FIGURE 6 is a diagrammatic perspective view representative of the wiring circuitry of one illustrative form of base unit 4 for selectively illuminating the demonstration devices of all embodiments by switch means mounted in the annex control panel 6. FIGURE 7 is another form of the same general electrical schematic and can be referred to simultaneously with the following description.

Pairs of jack receptacles will be identified by letters for easier identification of and with the associated components, for example: the pair of receptacles 64, 64 are designated A. The innermost two pair of receptacles 50, 50 for receiving the jacks 48, 48 of the rod assembly mounting brackets 16, 16 are designated B and $B_1$; the right-hand set of receptacles 53 and outer right-hand set 50, 50 are designated E and $E_1$, respectively; the set 52, 52 to the left of B is designated C; the outer left-hand set 50, 50 are designated D; the sets 56, 56 on the left end of base unit 4 are designated $D_1$; and the sets 54, 54 on the right end of unit 4 are designated F. A first group of the receptacle sets A, B, $B_1$, C, E, $E_1$ and F are wired in parallel to a first battery means or other suitable power source 66, preferably 9 volts, in the circuit as shown. The other two sets of receptacles D and $D_1$ comprise the second group and are connected in parallel with a second power source means 68, preferably of 3 volts. A first switch S1 and an associated small resistance 70 (approximately 10 ohm, ½ watt) are connected in series with the first group of receptacle sets and between the two parallel header wires 72 and 74. A second switch S2 with no associated resistance is connected in parallel to switch S1 between wires 72 and 74. A third switch designated SD is interposed between lead wire 74 and the aforementioned second power source which is preferably a 3 volt battery pack, and in which circuit the second group of receptacles D and D1 is connected as shown. The switches S1 and S2, together with a third switch SD, are used to demonstrate this first described gas laser embodiment and are marked with the legend "gas" on the control panel 6. Another set of switches $S'_1$ and $S'_2$, to be described hereinafter, are shown and identified for use with the solid state demonstrators and are accordingly so identified. The center switch SD is shown common to both forms. A disconnect means shown broadly at 75 in FIG. 6 may be used to facilitate a quick disconnection between the base unit and control panel unit.

The assembled operation of the gas laser demonstrator of this invention will now be described. The laser tube assembly 8 is mounted as shown in the brackets 16, 16. Small discs of transparent red colored plastic such as designated 76, FIGS. 2 and 5, are preferably interposed between the light bulbs and the rods within the respective housings or brackets to cause a red glow throughout the acrylic rod assembly when the bulbs are lighted. It is to be understood that these discs can be of other colors such as blue, or green, to resemble the different gas mixtures as would be used in the real lasers. The lights 58, 58, within supporting housings 60, 60, after assembled on the electrode rods 12 and 14 are connected into the circuitry by their wires and jacks 62, 62 in the A receptacles on the back of the unit 4. The lights 46, 46 within brackets 16, 16 are wired to the jacks 48, 48 and respectively connected into the circuitry by insertion into the B and B1 receptacles, and thereby become operative responsive to selective closing of switches S1 and SD. Each of the end mirror sub-assemblies 22 and 22a are jacked into their corresponding base receptacles D and $E_1$ respectively. In this form, only sub-assembly 22 is electrified, in that it houses the aforementioned flashbulb 36 and spot bulb 38 which are wired in parallel and when so connected in the circuit are operatively illuminated responsive to closing of the switch SD at the desired moment.

The initial step in the operation is to close the switch S1 which due to the resistance 70, effects a soft red colored glow to flow from the power source through the whole assembly as though being illuminated by the electrodes 12 and 14. This condition resembles the gas in a real laser when it is first ignited by high voltage. By including the lighting means in brackets 16, 16 in addition to those in the electrode cap housings 60, 60, a more positive illumination of the rod assembly 8 is assured, although it is to be understood that either one or the other source may be omitted. When switch S2 is closed a higher voltage from the battery or other suitable power source is imparted to the same bulbs, because this circuitry by-passes the resistance 70, and thereby causes a much brighter glow in the assembly. This stage resembles a real gas laser just before the laser beam shoots out of the end of the Brewster window. At the desired moment, the switch SD is closed and the lesser second power source 68, preferably the 3 volt battery pack, simultaneously causes the bulb 36 to "flash" and lights the spot bulb 38 which projects a small spot of light onto the mirror and which makes it appear that a red beam of light is emitting from the laser rod 10 and striking the front of the mirror.

Again referring to the electrical schematic of FIG. 7, it is to be understood that the direct power source of battery pack 66 can be either eliminated from the circuit and replaced with a small AC transformer to reduce a standard 115 VAC to approximately 9 or 10 volts. Such a substitution can be made at points X and Y of the circuit shown in FIG. 7. Alternately, a selective dual power unit incorporating both an exemplary 9 volt direct battery power source and a small transformer as aforementioned, illustrated in FIG. 8, may be included in the circuit at the corresponding points X and Y in lieu of battery pack 66. The unit of FIG. 8 is selectively operable by means of the double pole double throw switch 78. A further arrangement contemplated is the provision of jack type or other suitable connections at points X and Y which would be exposed in either the base unit or the control panel unit and operatively connected with a separate power source not physically embodied within either unit.

Proceeding now to FIGS. 9–12, two different embodiments of solid state laser demonstrators will now be described. The same base unit 4 and control panel 6 is intended for use with these embodiments, and accordingly need not be redescribed in detail. The solid state laser demonstrator of FIG. 9 includes a ruby rod and light pump assembly designated generally at 80, and comprises a light conducting transparent rod 82, similar in character to the acrylic or polystyrene rod 10 aforementioned, approximately one foot long. Additionally, the spirally encircling light pump coil 84 may be easily fabricated from a length (approxi. 9″–10″) of similar stock material which is heated and bent into the desired coil and further provided with depending terminal ends as shown for mounting into the same type brackets 16, 16 described in conjunction with the first gas laser form. The brackets 16 were described as being provided with vertical apertures or recesses in both the lower and upper parts 17. Their purpose is now apparent in that additional flashlight spot bulbs 86, 86 are preferably mounted in said upper recesses and wired to the jacks 88 which project downwardly from the upper bracket parts 17 for cooperative electrical and physically stabilizing connection with the complementary mounted jack receptacles 90, 90 provided in the lower parts of brackets 16. Receptacles 90, are in turn wired or otherwise electrically connected with the lowermost jacks 48 and receptacles 50 which connect with the aforementioned wiring circuitry. The terminal ends of the light pump coil are inserted into the recesses of brackets above said lights 86, 86, and may have similar colored plastic discs interposed therebetween to achieve the desired color glow when the circuit is energized. Alternately, colored polystyrene rods may be used having the desired colors embodied therein. Another small light bulb 92 is disposed within a housing 94, and, similar to the housing 60, is slip fitted over one end of rod 82. The light is connected into the circuitry by the wires 96 and jackplugs 98, 98 which connect in the pair of receptacles designated F at the adjacent end of the base unit.

At the opposite end of the base unit 4 a synthetic diamond target 100 is supported in a bracket 102 which is provided with a separable base 104. Base 104 is preferably provided with the aforementioned type of jack-plugs to which is wired a lamp socket 106 adapted to receive a miniature flash bulb 108, better shown in FIG. 10. A light conducting transparent flash rod 110, fabricated of either an acrylic or polystyrene material like the other rods, is heated and bent into a U-shape, one end of which is attached through and adjacent to an aperture in the end wall of said bracket as shown at 112 (FIG. 10) at a position opposite the bulb 108. The other free end terminates closely adjacent the hidden face of the diamond target, as designated at 114, FIG. 10.

A so-called "Brewster" beam focusing mirror 116, supported on a bracket 118 is interposed with its center on the imaginary axis designated 122 existing between the diamond target and the free end 120 of ruby rod 82. While there are no electrical connections associated with said mirror, the base is preferably provided with mounting jacks of the aforementioned type and is adapted to be received in either the B or C set of jack receptacles of the base unit 4, although shown in set C in FIGS. 9 and 10.

The principle of operation is the same as that of the previously described embodiment. FIG. 12 is representative of the electrical schematic and is generally the same as that of FIG. 7, except that those lights and switches used in the circuit to demonstrate the previously described gas laser form have been shown only in broken outline, with the solid lines representing a preferred circuit for the instant solid state forms. Also this schematic includes the dual power source with selective switch 78 (as described in FIG. 8) inserted into the system at points X and Y.

In demonstrating the operation of the representative solid state ruby laser of FIG. 9, reference is made to the "Solid State" side of the same control panel 6 in which switches $S'_1$ and $S'_2$, together with switch SD, are utilized for the said purpose. Upon closing of the switch $S'_1$, the resistance 124 (FIG. 12) which is preferably the same as the resistance 70 of FIG. 7, impedes the full flow of the voltage from power source and represents the initial soft red glow of the laser rod assembly 80, by simultaneously illuminating the small bulbs 86, 86 of the light pump coil 84 and the light bulb 92 mounted at the end of the rod 82. Upon subsequently closing switch $S'_2$, the higher voltage is imparted to the assembly to make it glow brighter and which is representative of the optical pumping of a real laser responsive to the chromium ions within the ruby crystal being excited to a very high energy level, just before lasing. At the desired moment, the switch SD, which is connected to receptacles D and into which the diamond target bracket and flash bulb assembly are plugged, is closed, causing the bulb 108 to flash. The light emitted by said flash is instantly transmitted up through the flash rod 110 to the point 114 adjacent the diamond target 100 and realistically resembles the effect of the stored-up energy of the light waves lasing from the end 120 of the ruby rod 82 and passing through the "Brewster" mirror 116.

In FIG. 10 the assembly designated 126 depicts a slightly different embodiment of the solid state laser, representing, for example, an emerald rod 128 and the associated flash coil or light pump 130, shown spiraled about an interposed frusto-conical shaped, sealed cooling chamber 132. The cooling chamber 132 is hollow and is provided with inlet and outlet tubes 134 and 136 respectively, through which the cooling chamber is adapted to be filled with water. The free ends of the tubes 134 and 136 are then inserted into a pair of apertures 138, 138 provided in base unit 4 which are representative of connections to a circulating pump, not shown. The cooling system of a real laser is intended to dissipate much of the high temperature built up during the excitation of the ions therein.

Due to the tapered and enlarged water cooled housing at the end designated 134, it may be desirable to either shorten or extend the respective terminal ends of the light pump coil 130 to enable the front leg to be inserted into the aperture provided in the top portion 17 of the bracket 16, and the rear leg to be inserted into the aperture or recess 44 as previously described in the earlier gas laser embodiment. As long as the bracket sections are appropriately wired, it is contemplated that the various said laser rod assemblies may be mounted in either the lower or upper parts thereof.

Aside from the difference of the water cooled housing 132 and appurtenances of the solid state emerald rod assembly in FIG. 10, and with assurance of the same axial alignment of the Brewster mirror 116 and the diamond target 100, the operation is exactly the same as that described for FIG. 9 and need not be repeated. FIG. 11 is a transverse cross-sectional view as taken substantially through the cooling chamber and a lower portion of a mounting bracket 16, clarifying the structural relationships thereof.

From the foregoing detailed description it is apparent that a novel, useful and realistic teaching aid device has been evolved which achieves all of the objects and advantages as set forth in the preamble of this specification. Each of the parts of these demonstration devices and each step of their respective operations constitute realistic elements of analogy between said devices and their real laser counterparts.

While specific detailed exemplary embodiments have been shown and described, it is to be understood that various changes and alterations, such as reducing the number of and having some of the components of the different laser forms share more common jack receptacles and operating switches, combining the control panel and base unit or providing a completely external source of power adapted for connection with said base unit, may be made by those skilled in the art without departing from the inventive concept as defined in the appended claims.

I claim:
1. A device for demonstrating the operating principle of an optical laser or other phenomena of stored energy and trigger release comprising:
  (a) A simulated laser assembly including a laser tube sub-assembly fabricated of a clear, light-conducting material;
  (b) variable light producing means associated with said laser tube sub-assembly and adapted to be connected with an electrical power source means; and
  (c) an electrical circuit including a plurality of switch means interconnecting the light producing means and the power source means, said switch means being independently operable for effecting energization of the light producing means to simulate progressive stored energy level build-up of a laser.

2. A demonstration device as defined in claim 1 wherein the simulated laser assembly of paragraph (a) therein includes:
  (1) a mounting base unit and;
  (2) a pair of mirror sub-assemblies mountable on said base unit at opposite ends thereof;
  (3) and wherein the laser tube sub-assembly resembles a gas laser tube supportable on said base unit intermediate the aforesaid mirror sub-assemblies.

3. A demonstration device as defined in claim 2, wherein:
  (a) the laser tube sub-assembly includes:
    (1) a horizontally disposed base rod member of predetermined length having free ends;
    (2) a pair of spaced apart, vertically disposed rod members united to said base rod member intermediate the ends thereof; and
    (3) a planar simulated Brewster window mounted on each end of the base rod, with the plane of each window disposed at a predetermined angle relative to the longitudinal axis of the base rod;
  (b) and means mountable on said base unit for supporting said laser tube sub-assembly, including bracket means embodying some of the aforementioned variable light producing means therewithin and disposed adjacent to said laser tube sub-assembly.

4. A demonstration device as defined in claim 3 wherein:
  (a) the variable light producing means includes light means disposed within one of said mirror sub-assemblies; and
  (b) the mounting base unit includes at least a major portion of the electrical circuitry.

5. A demonstration device as defined in claim 3 wherein:
  (a) the variable light producing means includes light means disposed within one of said mirror sub-assemblies;
  (b) the mounting base unit includes at least a major portion of the electrical circuitry; and
  (c) the switch means includes a first, second and third switch means connected in parallel with a power source, the sequential operation of which energizes the light producing means to respectively resemble initially a low energy level soft glow of the simulated gas rod sub-assembly, a subsequently brighter glow resembling a high energy level of the light waves and finally a triggered flash of light and simultaneous projection of a beam of light on the mirror of the said mirror sub-assembly embodying a part of the variable light means.

6. A demonstration device as defined in claim 1 including electrical power source means embodied within the laser assembly.

7. A demonstration device as defined in claim 1 including means associated therewith for selectively connecting either a direct current or an alternating current electrical power source means into the circuitry thereof.

8. A demonstration device as defined in claim 1, wherein the simulated laser assembly includes:
  (a) a mounting base unit having means for removably mounting various of the component parts of the assembly; and
  (b) the laser tube sub-assembly resembles a simulated solid state laser mounted on said base unit at one end thereof and having a first, straight rod length of the light conducting material and a second rod length of said material spiraly wound around said first rod length to resemble a light pump.

9. A demonstration device as defined in claim 8 further including:
  (a) a simulated diamond target and support means embodying a part of the light producing means and mounted on the other end of said base unit with the target in axial alignment with first described rod length of the laser tube sub-assembly;
  (b) and a simulated "Brewster" mirror interposed between said target and laser tube sub-assembly and disposed with the plane of the mirror transverse to and with its center substantially on alignment with a projected axis of said first rod length.

10. A demonstration device as defined in claim 9 wherein:
  (a) the variable light producing means includes a small flashlight bulb and mounting means disposed adjacent each end of the second, spirally wound rod length, and also at one end of the said first rod length; and
  (b) the light producing means embodied within said target includes a relatively small flash bulb and light conducting means for directing the flash to the target responsive to predetermined energization of said bulb.

11. A demonstration device as defined in claim 8 wherein:
  (a) the second rod length is spirally wound around the first rod length and is progressively spaced therefrom;
(b) the laser tube sub-assembly includes a transparent, frusto-conical hollow chamber disposed around and coaxial with a major length of the first rod length;
(c) said frusto-conical chamber defines a water cooled housing which is embraced by the spirally wound second rod length, and is provided with inlet-outlet means adaptable to receive and discharge a transparent liquid into and from said chamber.

12. A demonstration device as defined in claim 9 including a frusto-conical hollow chamber interposed between the first and second rod lengths to resemble a water cooling chamber; said hollow disposed around and coaxial with a major length of the first rod length.

13. A demonstration device as defined in claim 1, wherein the variable light producing means includes a plurality of small flashlight type lamp bulbs disposed closely adjacent a plurality of places on the laser tube sub-assembly; and a selective assortment of clear, different colored, light conducting discs selectively positionable between the lamp bulbs and the laser tube sub-assembly.

14. A demonstration device as defined in claim 3 wherein part of the variable light producing means include a light bulb and housing means disposed on the ends of the vertically disposed rod members.

15. A device for demonstrating the operating principle of an optical laser or other phenomena of stored energy and trigger release comprising:
(a) a simulated laser assembly including both gas and solid state laser tube sub-assemblies fabricated of a clear, light-conducting material;
(b) variable light producing means associated with each of said laser tube sub-assemblies and adapted to be connected with an electrical power source means;
(c) a mounting base unit having means to enable selective, interchangeable mounting thereon of a predetermined type of laser tube sub-assemblies; and
(d) an electrical circuit in association with said base unit and including a plurality of switch means interconnecting the light producing means and the power source means, said switch means being independently operable for effecting energization of the light-producing means to simulate progressive stored energy level build-up of a laser.

16. A demonstration device as defined in claim 15, further including:
(a) a pair of mirror sub-assemblies mountable on said base unit at predetermined position and at opposite ends of a simulated gas laser tube sub-assembly;
(b) one of said mirror sub-assemblies including a part of the light-producing means mounted therewith;
(c) a simulated diamond target and means for mounting it upon said base unit in spaced apart association with one of the solid state type of laser-tube sub-assemblies;
(d) said diamond target including a part of the light-producing means embodied therein; and
(e) a simulated Brewster mirror means having means for mounting it upon said base unit and adapted to be interposed between a solid state laser tube sub-assembly and said diamond target.

17. A demonstration device as defined in claim 15, including a self-contained electrical power source means for energizing the lighting means.

18. A demonstration device as defined in claim 17 wherein the power source means includes a direct current battery pack of approximately 9 volts; an alternate 115 volt A.C. transformer, and means for selectively connecting the desired power source into the electrical circuitry.

19. A demonstration device as defined in claim 15 wherein one of the solid state laser tube sub-assemblies includes a straight laser tube and a coiled light pump tube disposed around the laser tube.

20. A demonstration device as defined in claim 19 including simulated water pump means in association therewith.

References Cited

UNITED STATES PATENTS

| | | | |
|---|---|---|---|
| 2,067,352 | 1/1937 | Smith | 46—229 |
| 3,082,546 | 3/1963 | Van Baerle | 35—10 |
| 3,171,057 | 2/1965 | Buckingham | 35—10 X |

OTHER REFERENCES

Stong: "The Amateur Scientist," September 1964, issue of Scientific American, page 227.

EUGENE R. CAPOZIO, *Primary Examiner.*

H. S. SKOGQUIST, *Assistant Examiner.*